United States Patent
Bärnthaler et al.

(10) Patent No.: US 11,737,382 B2
(45) Date of Patent: Aug. 29, 2023

(54) SOIL WORKING TOOL

(71) Applicant: BOEHLERIT GmbH & Co.KG., Kapfenberg (AT)

(72) Inventors: Walter Bärnthaler, St. Marein im Mürztal (AT); Hannes Burböck, Kindsberg/Aumühl (AT)

(73) Assignee: BOEHLERIT GMBH & CO.KG., Kapfenberg (AT)

( * ) Notice: Subject to any disclaimer, the term of this patent is extended or adjusted under 35 U.S.C. 154(b) by 0 days.

(21) Appl. No.: 16/259,168

(22) Filed: Jan. 28, 2019

(65) Prior Publication Data

US 2019/0230838 A1    Aug. 1, 2019

(30) Foreign Application Priority Data

Jan. 29, 2018   (AT) .................................. 50015/2018

(51) Int. Cl.
*A01B 15/06* (2006.01)
*A01B 15/04* (2006.01)
*A01B 23/02* (2006.01)

(52) U.S. Cl.
CPC ............. *A01B 15/06* (2013.01); *A01B 15/04* (2013.01); *A01B 23/02* (2013.01)

(58) Field of Classification Search
CPC ......... A01B 15/04; A01B 15/06; A01B 23/02; A01B 15/02
USPC ............................................. 172/730, 772.5
See application file for complete search history.

(56) References Cited

U.S. PATENT DOCUMENTS

| | | | | |
|---|---|---|---|---|
| 4,127 A | * | 7/1845 | Bullock | A01B 15/04 172/761 |
| 444,417 A | * | 1/1891 | Arnett | E02F 3/8152 37/301 |
| 969,469 A | * | 9/1910 | Gose | A01D 29/00 171/83 |
| 991,810 A | | 5/1911 | Whiting | |
| 1,646,023 A | * | 10/1927 | Hawks | A01B 39/18 172/192 |
| 1,976,268 A | * | 10/1934 | Reynolds | A01B 15/06 172/719 |
| 2,309,223 A | * | 1/1943 | Staring | A01G 23/093 37/301 |

(Continued)

FOREIGN PATENT DOCUMENTS

| | | |
|---|---|---|
| CZ | 304675 | 8/2014 |
| DE | 1222304 | 8/1966 |

(Continued)

OTHER PUBLICATIONS

Austria Search Report conducted in counterpart Austria Appln. No. Gm 50018/2018 (dated Jul. 27, 2018).

(Continued)

*Primary Examiner* — Thomas B Will
*Assistant Examiner* — Joel F. Mitchell
(74) *Attorney, Agent, or Firm* — Greenblum & Bernstein, P.L.C.

(57) ABSTRACT

A soil cultivation tool, in particular a plowshare, includes a base body on which cartridges are optionally arranged and at least first cutting elements that are attached to the base body or the cartridges in order to cut into the earth along a working direction. The first cutting elements are arranged in separate seats.

17 Claims, 3 Drawing Sheets

(56) References Cited

U.S. PATENT DOCUMENTS

Figure 4:
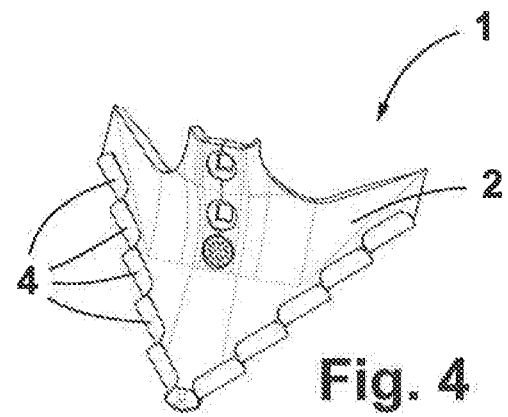

| | | | |
|---|---|---|---|
| 2,316,097 A | | 4/1943 | Mohr |
| 2,821,217 A * | | 1/1958 | Shald .................... E02F 3/8152 |
| | | | 144/34.1 |
| 5,077,918 A * | | 1/1992 | Garman ................ E02F 9/2808 |
| | | | 172/701.3 |
| 5,224,555 A * | | 7/1993 | Bain et al. ............ E02F 3/8152 |
| | | | 172/701.3 |
| 6,854,527 B2 * | | 2/2005 | Manway et al. ...... E02F 3/8152 |
| | | | 172/701.1 |
| 8,857,531 B2 * | | 10/2014 | Smeets et al. ......... A47B 91/12 |
| | | | 172/772.5 |
| 9,736,973 B2 * | | 8/2017 | Widmaier et al. ..... A01B 35/26 |
| 9,854,721 B2 * | | 1/2018 | Smeets .................. A01B 39/22 |
| 2003/0188463 A1 | | 10/2003 | Manway et al. |
| 2013/0240225 A1 | | 9/2013 | Widmaier et al. |
| 2016/0014950 A1 | | 1/2016 | Smeets |
| 2017/0273238 A1 * | | 9/2017 | Penner ................. A01D 34/015 |

FOREIGN PATENT DOCUMENTS

| | | |
|---|---|---|
| DE | 102008056770 | 6/2011 |
| DE | 202010008085 | 10/2011 |
| DE | 202010017959 | 4/2013 |
| DE | 102013102420 | 9/2014 |
| DE | 202009019047 | 11/2015 |
| EP | 0923851 | 6/1999 |
| EP | 2591648 | 5/2013 |
| EP | 2962538 | 1/2016 |
| EP | 2995180 | 3/2016 |
| RU | 2366139 | 9/2009 |
| WO | 82/04375 | 12/1982 |
| WO | 00/42834 | 7/2000 |
| WO | 2010/149464 | 12/2010 |

OTHER PUBLICATIONS

Europe Search Report/Office Action conducted in counterpart Europe Appln. No. 18153860.4 (dated Jul. 18, 2018) (w/ partial machine translation).

Slovakia Search Report conducted in counterpart Slovakia Appln. No. 29-2018 (dated Apr. 6, 2018).

* cited by examiner

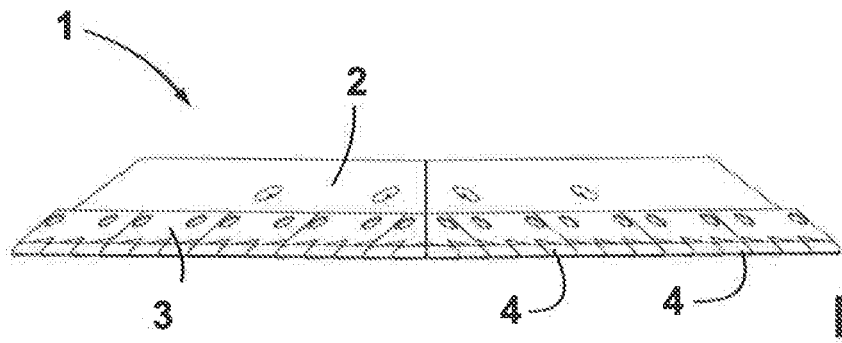
Fig. 1
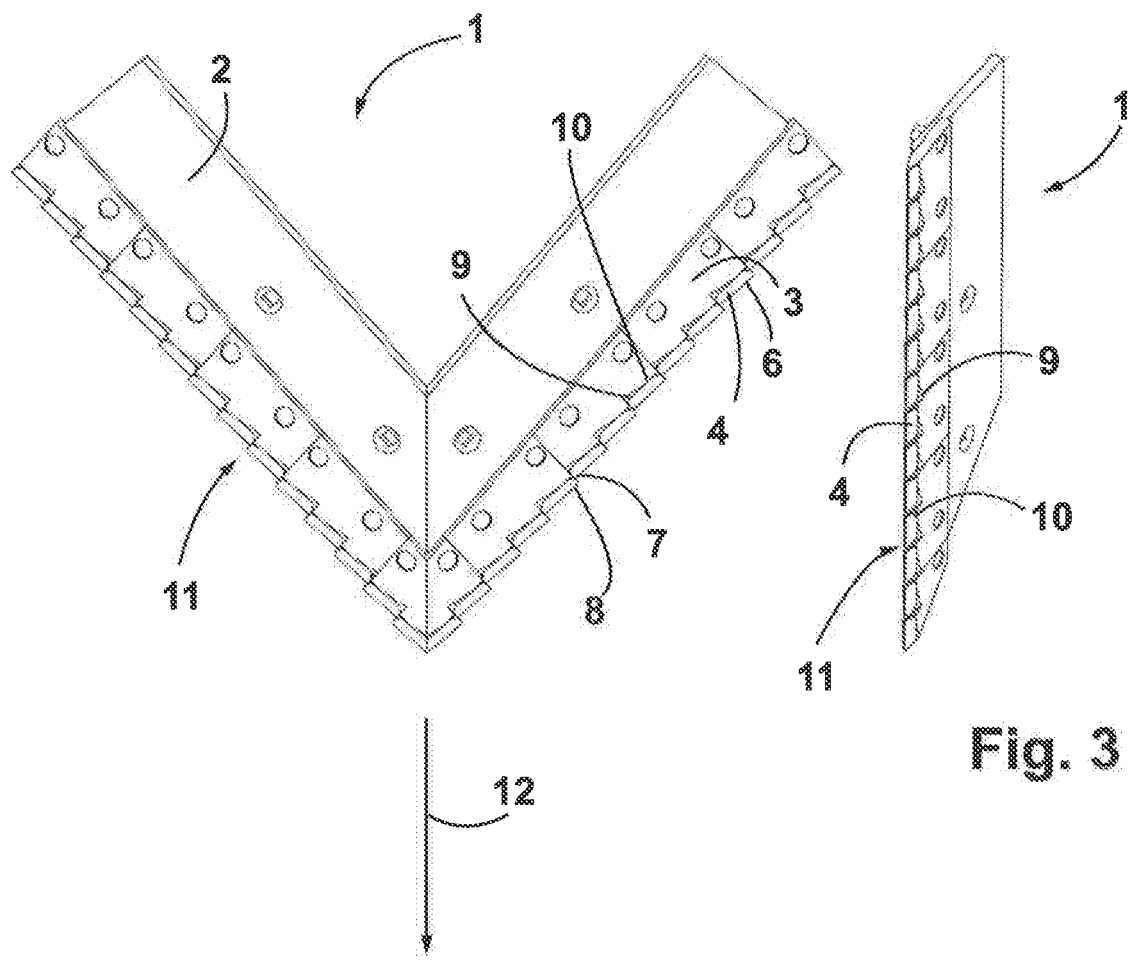
Fig. 2
Fig. 3

SOIL WORKING TOOL

The invention relates to a soil cultivation tool, in particular a plowshare, comprising a base body on which cartridges are optionally arranged and at least first cutting elements that are attached to the base body or the cartridges in order to cut into the earth along a working direction.

For quite some time, soil cultivation tools such as goosefoot plowshares or other plowshares have been indispensable work equipment for preparing soil and earth. Suitable soil preparation prior to a sowing is vital to achieving a good crop yield. In addition, from an ecological standpoint today, due to the poor reputation of sprays and the debate about the use thereof, suitable soil preparation can also effectively contribute to minimizing the amount of spray required.

Goosefoot plowshares are used in particular for shallow soil cultivation. Normally, the earth is sliced through in a planar manner at a depth of approximately 2 cm to 8 cm using one or more plowshares, wherein the goal is to chop off weeds in particular. As a result, the topmost layer of earth is ideally completely separated from the earth lying thereunder, so that the separated topmost layer can be prepared in an effective manner.

During the cutting-through of the earth, goosefoot plowshares or analogous soil cultivation tools are pulled by a transportation means such as a tractor. The front faces of the plowshares are then engaged in a cutting manner with the earth. The earth so cultivated applies a large amount of resistance to the plowshares acting in a cutting manner, which is why the plowshares, which are typically made of a steel, are subject to considerable wear.

To increase a wear resistance of plowshares or other soil cultivation tools, it has recently become known to equip plowshares or similar soil cultivation tools with cemented carbide bodies. The cemented carbide bodies, which are normally embodied in a plate-like shape, can thereby be attached to a base body in non-cutting regions in order to reduce wear of the base body from sliding earth or other abrasive materials. One example of this can be found in EP 2 995 180 A1.

In addition, the use of cemented carbide elements at a position of a cutting edge has also become known. In the case of both a non-cutting use and also a cutting use of a fitting with cemented carbide elements, a relatively expensive supplementary fitting compared to a base body that, as mentioned, is typically composed of steel is initially introduced through the cemented carbide. However, in relation to an entire lifespan of the soil cultivation tool, these costs later pay off, so that the initial increased expense is more than compensated for when calculated over the service life.

If cemented carbide elements on soil cultivation tools are provided for a cutting engagement, the elements are soldered onto a base body. For this purpose, a groove is provided in which the cutting plates are placed, wherein the cutting plates are in contact with one another. However, it is thereby disadvantageous that a very laborious process is involved, since the individual cutting plates must be precisely positioned relative to one another. In addition, as a result of the intended contact during use, the individual cutting plates can also reciprocally apply force loads to one another.

This is addressed by the invention. The object of the invention is to specify a soil cultivation tool of the type named at the outset that can be produced in a simple manner and yields good results when used.

This object is attained if, with a soil cultivation tool of the type named at the outset, the first cutting elements are arranged in separate seats. It is thereby advantageous that the at least first cutting elements can be easily positioned during the soldering-on, wherein the positioning is in particular independent from other cutting elements. In addition, the first cutting elements cannot reciprocally influence one another during use, for example, if a particularly large force is applied to a single cutting element.

In addition to the first cutting elements, which are typically embodied as cutting plates, second cutting elements and, where necessary, other cutting elements can also be provided. However, if other cutting elements are provided, it is preferred that a cutting work is entirely, or at least mostly, performed by the first cutting elements, which are for this purpose arranged in the corresponding seats.

It is particularly preferred that the seats comprise a stop for positioning the first cutting elements. The corresponding cutting elements can then be positioned very easily in the individual seats during the soldering-on. Another advantage results from the fact that, if the first cutting elements are embodied as cutting plates, the stop can run further around a cutting plate than previously in the prior art, namely not only over a long side, but also partially over a short side of the first cutting elements or cutting plates. In this manner, a suitable distribution of force onto the base body is also ensured during cutting use, which in turn has an overall positive effect on the durability of the soil cultivation tool.

If the first cutting elements are arranged such that they are spaced apart from one another, a reciprocal influence during a cutting use is prevented, which produces the advantages illustrated.

In principle, the first cutting elements can be composed of any desired material that yields adequate mechanical characteristics in terms of strength, toughness, and abrasive properties. For example, various composite materials or ceramics can be used for this purpose. However, it is particularly preferred that at least some, preferably all, of the first cutting elements are made of or with cemented carbide. Advantageously, the first cutting elements are cutting plates that are constructed from a cemented carbide. The cemented carbide can be a cemented carbide which, in addition to a typical metallic binder made of cobalt, iron, and/or nickel on a scale of 6 percent by weight (wt %) to 12 wt %, comprises tungsten carbide. The tungsten carbide can, where necessary, be partially replaced by up to 25 wt % titanium carbide. Average grain sizes of the tungsten carbide and the optionally provided titanium carbide are thereby in the range of 0.8 µm to 10 µm. Average grain sizes of 1.5 µm to 4.0 µm are preferred. The first cutting elements in general, and the cutting plates in particular, can be coated, whereby a wear resistance is increased. Preferred coatings are coatings of an aluminum oxide or an aluminum titanium nitride. Also possible are combined coatings having a plurality of individual coating layers. The coating layers can, in particular, be deposited by means of a CVD method. A thickness of a possible coating layer is normally 2 µm to 15 µm, in particular 3 µm to 5 µm.

In a soil cultivation tool according to the invention, the base body can be made of a steel. If cartridges are provided, then these are attached to the base body and carry the first cutting elements. Cartridges are particularly expedient where the base body itself does not wear, but rather only the actively cutting regions that are to be replaced when a certain wear mark is reached. The first cutting elements are then attached to the cartridges. The individual cartridges can be replaced as needed. If cartridges are provided, then they are advantageously also made of a steel like the base body. The same steel can be used as the steel used for the base body, but this is not imperative.

The base body can in principle have any desired shape. For a cutting, planar incision into the earth, it is advantageous if the base body is essentially embodied in a V shape in a top view. The individual first cutting elements are then attached externally to the front face of the V shape and form cutting regions connecting to one another. To bridge over a gap on a tip of the V shape, at least one second cutting element can be attached to the tip of the V shape. However, it is expedient that, in a top view of the base body, the first cutting elements are offset from one another in a recessed manner along a working edge, at least in sections. The V shape is then symmetrical along a working direction during use, wherein in a top view the cutting elements or cutting plates are arranged on the working edge at a predetermined incline to the working edge. As a result of the offset of the individual cutting elements to one another, the frontal cutting edges of the individual cutting elements, when viewed in the working direction, partially overlap in regard to the cutting plane thereof, that is, regions of the cutting edges are arranged one after another in the working direction. This yields two advantages: On the one hand, it is thus ensured that, despite the first cutting elements being attached in individual, separate seats, the gap between the elements is bridged as a result of the conceptual overlapping of the cutting edges. The earth can thus be cut through in a planar manner, even though the first cutting elements are spaced apart from one another. On the other hand, the overlapping of the cutting edges causes the region of the cutting edge of a recessed first cutting element to become actively cutting when the corresponding preceding region of the cutting edge of the adjacent, frontally positioned first cutting element is no longer actively cutting. A useful life of the soil cultivation tool can thus be increased. Moreover, because of the recessed offset of the first cutting elements relative to one another, weeds which must be cut through cannot easily move out of the way by sliding along a continuous cutting line, but are rather cut more effectively.

The individual first cutting elements can be pitched at an incline in relation to a working edge. The extent of the incline and of the recessed offset depends on the V shape of the soil cultivation tool. Ultimately, the arrangement of the first cutting elements with regard to the incline and recessed offset is chosen such that the aforementioned effects of the consecutive engagement by sections of individual cutting edges on adjacent cutting elements are achieved.

An arrangement of the cutting elements, in particular when the same are embodied as cutting plates, advantageously occurs such that, as viewed from the working direction, individual cutting edges of the first cutting elements are arranged at the same height. The desired continuous, effective, and planar cut in the earth is thus achieved. The cutting edges are thereby partially arranged one after another in the working direction, as explained above. In this context, the first cutting elements can be positioned at an angle of 20° to 50°, preferably 25° to 35°, to a base area of the base body. Such angles are expedient for achieving the desired cutting performance with a beneficial wedge angle, but while also minimizing wear.

The seats provided for the first cutting elements can be created in the base body in any desired manner, for example, by laser cutting. It is also possible to already embody a base body with a corresponding shape. It is particularly beneficial, however, if the base body is formed as a forged body of steel, and that the seats are incorporated through a machining process, in particular by milling. This allows a fast and efficient fabrication of a soil cultivation tool, since after the milling the carbide fitting or attachment of cutting elements can immediately take place through a materially bonded connection such as adhesive bonding or soldering.

It is possible that further additions are made to the base body in order to design the base body to be more wear-resistant. In particular, these additions can be supplementary plates that are attached to the base body in suitable recesses and exhibit a higher abrasive resistance to the sliding earth than the base body on its own. Specifically, plates made of composite materials or a ceramic, as well as cemented carbide plates, can be used for this purpose. In contrast to the illustrated cutting elements, however, these supplementary plates are a wear protection for the base body and do not produce any cutting effect.

Figure 5:
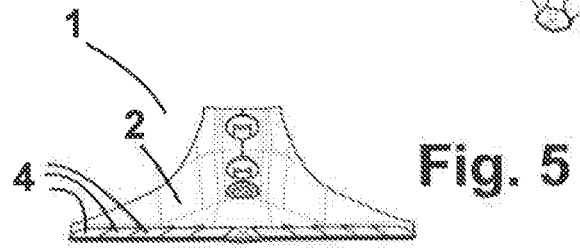
Figure 6:
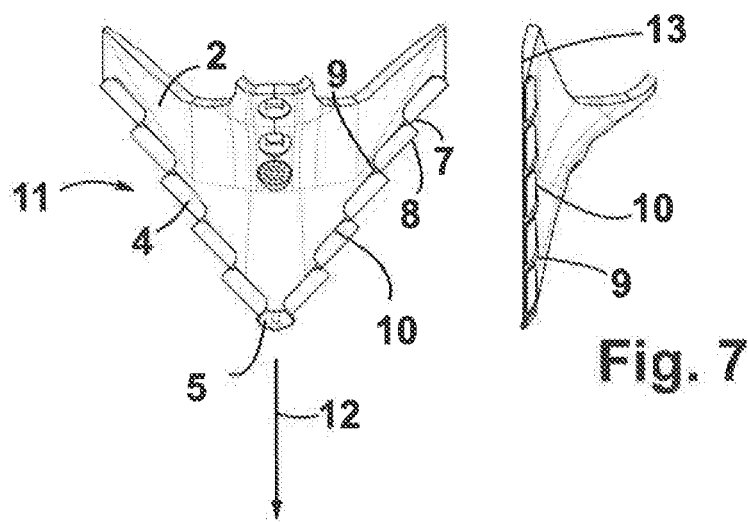
Figure 7:
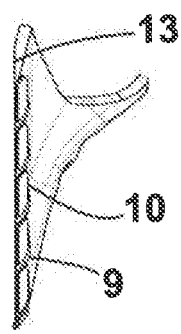
Figure 8:
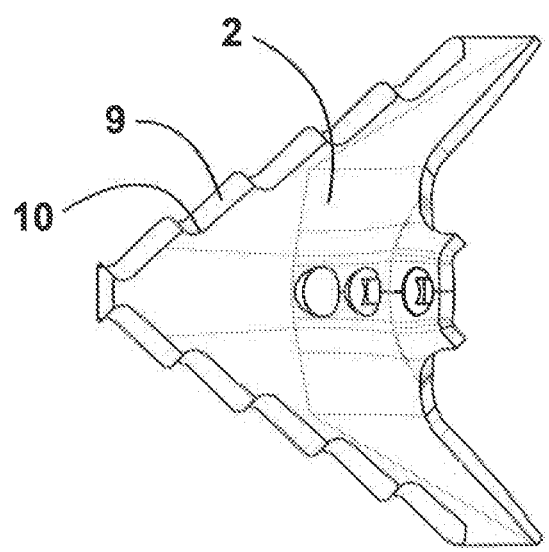

Additional features, advantages and effects of the invention follow from the exemplary embodiments described below. The drawings which are thereby referenced show the following:

FIG. 1 A frontal view of a first soil cultivation tool;

FIG. 2 A top view of the soil cultivation tool according to FIG. 1;

FIG. 3 The soil cultivation tool from FIG. 1 in a side view;

FIG. 4 A perspective view of a second soil cultivation tool;

FIG. 5 A frontal view of the soil cultivation tool according to FIG. 4;

FIG. 6 A top view of a soil cultivation tool according to FIG. 4;

FIG. 7 A side view of the soil cultivation tool according to FIG. 4;

FIG. 8 A top view of a soil cultivation tool according to FIG. 4 without cutting plates.

In FIG. 1, a first example of a soil cultivation tool 1 according to the invention is illustrated in a frontal view. In FIG. 2, the same soil cultivation tool 1 is illustrated in a top view, and is illustrated in a side view in FIG. 3.

The soil cultivation tool according to FIG. 1 through FIG. 3 comprises a base body 2. The base body 2 is formed from two side wings that are essentially embodied to be oblong, and which are beveled on one side and are connected to one another on this beveled side. The base body 2 can be composed of even more individual parts, but can also be embodied in one piece. Normally, the base body 2 is composed of a steel. The base body 2 has in a top view a V-shaped form, as can be seen in particular from FIG. 2. On a front face of the V-shaped base body 2, a plurality of cartridges 3 are arranged. The cartridges 3 are detachably connected to the base body 2, for example, by screws. The cartridges 3 completely cover a frontal side of the base body 2 and/or a working edge 11. Like the base body 2, the cartridges 3 can be fabricated from a steel. In particular, the cartridges 3 can be formed from the same steel as the base body 2, which is not imperative, however. On a front face of each cartridge 3, first cutting elements 4 are then attached, which elements are embodied as cutting plates. The cutting plates are located on a front face of the cartridges 3. Each cartridge 3, except for the first cartridge on the front face, accommodates three cutting plates, though a different number of cutting plates can also be provided on the cartridges 3. The cutting plates are composed of a more wear-resistant material than that of the cartridges 3 and/or the base body 2. Hereinafter, the cutting plates can, for example, be composed of a high-strength steel, a ceramic such as silicon carbide, a composite material such as a particle-reinforced metal, or particularly preferably of a cemented carbide. One seat 9 each is provided for the individual cutting plates. The seats thereby respectively comprise a stop 10 so that the cutting plates can be positioned particularly easily during their attachment in the cartridges 3. In addition, the stops 10 also serve to efficiently dissipate force from the cutting plates to the cartridges 3 during a use of the soil cultivation tool 1.

As can be seen from FIG. 3 in particular, the individual cutting plates are spaced apart or separated from one another as a result of the stops 10. To nevertheless achieve a continuous cutting line along a working edge 11, the individual cutting plates are recessed relative to one another, starting from the tip of the V-shaped soil cultivation tool 1, so that each cutting plate is respectively positioned with a front corner 7 of a cutting edge in the a region of a rear corner 8 of the preceding cutting plate. Because of the V-shaped embodiment of the soil cultivating device 1, a continuous cutting line results in a working direction 12 in this arrangement, since individual cutting edges 6 on the one hand are positioned at an identical height and on the other hand a recessed cutting edge 6 of a subsequent cutting plate in the working direction 12 overlaps with the cutting line of the cutting edge 6 of the preceding cutting plate. Thus, despite a spacing of the cutting plates, it is ensured that a continuous overall cutting line assembled along the working edge 11 is achieved, which is desired and necessary for a planar, uninterrupted cut in the earth.

If embodied from a cemented carbide, the individual cutting plates are connected to the cartridges 3 through soldering or adhesive bonding. If cutting edges 6 or cutting plates on a cartridge 3 are worn enough that they are no longer suitable for use, a single cartridge can be detached. The advantage thereby results that merely a section-wise replacement is necessary in precisely that region which is worn. A use of cartridges 3 and cutting plates is thus minimized.

In FIG. 4 through FIG. 8 a second example of a soil cultivating device 1 according to the invention is illustrated. In this soil cultivating device 1, the base body 2 is basically fabricated in one piece, and can be constructed from a steel by forging, for example. The base body 2 comprises at least one opening so that the base body 2 can be attached at the end of a pulling vehicle, such as a tractor, and the soil cultivation tool 1 can be pulled in the working direction 12. This corresponds to that operating principle which is also applied to a soil cultivation tool 1 according to FIG. 1 through FIG. 3.

In contrast to the first example according to FIG. 1 through FIG. 3, no cartridges 3 are provided. The first cutting elements 4 are again embodied as cutting plates that are, as in the first example, essentially rectangularly embodied in a top view. The cutting plates can once again be advantageously fabricated from a cemented carbide, and are in this case directly attached to the base body 2 through a materially bonded connection such as soldering or adhesive bonding. Relative to one another, the cutting plates are once again each recessed from one another along a working edge 11 that, according to FIG. 6, runs towards the rear starting from a tip of the once again V-shaped base body 2, so that with the seats 9 provided on the base body 2 a continuous cutting line also results with the spacing of the individual cutting plates that is present in this example. A spacing of the individual first cutting elements 4 or cutting plates in the individual seats 9 with stops 10 can be seen in particular in the side view according to FIG. 7. The first cutting elements 4 or cutting plates are attached at an incline and roughly form an angle of 30° with an imaginary base area 13 of the base body 2.

In FIG. 8, the base body 2 is illustrated without cutting plates so that the individual seats 9 and stops 10 can be seen in detail. Through the individual separate seats 9 for each individual cutting plate, a simple positioning during the production of the soil cultivation tool 1 is achieved. Each individual cutting plate can be easily aligned in a separate manner on a stop 10 in a seat 9, where it can be fixed in place in particular by soldering. Because the individual cutting plates are once again recessed relative to one another along the working edge 11, a continuous cutting line results despite the spacing of individual cutting plates that is created with the seats 9. Furthermore, the advantage is provided that, in relation to a cutting line, the more heavily wearing protruding regions or front corners 7 overlap with rear corners 8 of the cutting edges 6 of the cutting plates respectively arranged thereafter, so that if this protruding corner is worn, the cutting edge 6 of the subsequent cutting plate becomes actively cutting. A soil cultivation tool according to the invention thus also has, in addition to simple production, an optimized design of the individual first cutting elements in terms of a maximum service life.

As can be seen in FIG. 6, at least one second cutting element 5 can also be provided on the base body 2. The at least second cutting element 5 can, for example, be particularly designed to cover, as can be seen, the tip of the V-shape of the base body 2 and, aside from this, to produce the cutting performance that is also necessary at the tip.

CROSS-REFERENCE TO RELATED APPLICATION

This application claims priority under 35 U.S.C. § 119(a) of Austrian Application GM 50015/2018 filed Jan. 29, 2018, the disclosure of which is expressly incorporated by reference herein in its entirety.

The invention claimed is:
1. A soil cultivation tool, comprising:
a base body on which at least first cutting elements are attached in order to cut into the earth along a working direction, the at least first cutting elements having cutting edges on first sides, counter surfaces on second sides opposite the first sides, and edges extending between the first sides and second sides,
wherein the first cutting elements are arranged in separate seats and spaced from each other, the separate seats comprising stops configured for positioning the counter surfaces in the separate seats and for spacing the first cutting elements from each other, the stops being configured to run over the second sides and at least partially over the edges of the first cutting elements,
wherein the cutting edges of the first cutting elements are obliquely arranged to the working direction so that, in the working direction, each cutting edge has a leading edge and a trailing edge,
wherein, in adjacent first cutting elements, the trailing edge of a leading first cutting element is arranged to overlap in the working direction the leading edge of a trailing first cutting elements, and
wherein the at least first cutting elements consists of a cemented carbide.
2. The soil cultivation tool according to claim 1, wherein the first cutting elements are arranged spaced apart from one another.
3. The soil cultivation tool according to claim 1, wherein the base body is made of a steel.
4. The soil cultivation tool according to claim 1, further comprising cartridges, wherein the cartridges are made of a steel.

5. The soil cultivation tool according to claim 1, wherein, in a top view, the base body is embodied in a V shape.

6. The soil cultivation tool according to claim 5, wherein, in a top view of the base body, the first cutting elements are offset from one another in a recessed manner along a working edge, at least in sections.

7. The soil cultivation tool according to claim 1, wherein, as viewed from the working direction, individual cutting edges of the first cutting elements are arranged at the same height.

8. The soil cultivation tool according to claim 7, wherein regions of the cutting edges are arranged one after another in the working direction.

9. The soil cultivation tool according to claim 1, wherein the first cutting elements are positioned at an angle of 20° to 50° to a base area of the base body.

10. The soil cultivation tool according to claim 9, wherein the first cutting elements are positioned at an angle of 25° to 35° to a base area of the base body.

11. The soil cultivation tool according to claim 1, wherein the seats are created by milling.

12. The soil cultivation tool according to claim 1 being a plowshare.

13. The soil cultivation tool according to claim 1, further comprising cartridges detachably connected to the base body and to which the at least first cutting elements are connected, wherein the separate seats are formed on the cartridges.

14. The soil cultivation tool according to claim 13, wherein the cartridges are detachably connected to the base body.

15. The soil cultivating tool according to claim 1, wherein, when viewed from above, the cutting edges of adjacent first cutting elements are parallelly spaced.

16. The soil cultivating tool according to claim 1, wherein at least some of the cutting edges of the first cutting elements are parallelly recessed with respect to others of the cutting edges of the first cutting elements, and
wherein the at least some of the cutting edges of the first cutting elements are parallel to the others of the cutting edges.

17. The soil cultivating tool according to claim 1, wherein the cutting edges are arranged to form working edges; and
wherein some of the cutting edges forming the working edges are recessed, at least in sections, relative to others of the cutting edges forming the working edges so that the working edges, when viewed from above, have a jagged profile.

* * * * *